United States Patent
Liao et al.

(10) Patent No.: US 8,289,945 B2
(45) Date of Patent: Oct. 16, 2012

(54) METHOD AND APPARATUS FOR ADJUSTING REFERENCE FREQUENCY

(75) Inventors: Xue-Jian Liao, Daya Township, Taichung County (TW); Kuo-Chuan Lin, Sinyuan Township, Pingtung County (TW)

(73) Assignee: Qisda Corporation, Taoyuan County (TW)

( * ) Notice: Subject to any disclaimer, the term of this patent is extended or adjusted under 35 U.S.C. 154(b) by 1168 days.

(21) Appl. No.: 12/133,853

(22) Filed: Jun. 5, 2008

(65) Prior Publication Data
US 2008/0307023 A1    Dec. 11, 2008

(30) Foreign Application Priority Data
Jun. 6, 2007    (TW) .............................. 96120391 A (51) Int. Cl.
*H04J 3/06*    (2006.01)

(52) U.S. Cl. ........................................ 370/350; 370/503
(58) Field of Classification Search .................. 370/350, 370/503, 510
See application file for complete search history.

(56) References Cited

U.S. PATENT DOCUMENTS

| | | | |
|---|---|---|---|
| 4,870,366 A * | 9/1989 | Pelletier ........................ | 327/117 |
| 6,370,500 B1 * | 4/2002 | Huang et al. .................... | 704/208 |
| 6,603,818 B1 * | 8/2003 | Dress et al. .................... | 375/295 |
| 2004/0116083 A1 * | 6/2004 | Suzuki et al. ................. | 455/126 |

* cited by examiner

*Primary Examiner* — Phuc Tran (57) ABSTRACT

The invention discloses a method for adjusting a reference frequency. First, a training signal is received based on the reference frequency. Then, a target region of the training signal is divided by an original training sequence so that a quotient polynomial is generated. Afterward, the quotient polynomial is divided by a predetermined polynomial so that a remainder polynomial is generated. Finally, the reference frequency is adjusted based on the remainder polynomial.

20 Claims, 8 Drawing Sheets

METHOD AND APPARATUS FOR ADJUSTING REFERENCE FREQUENCY

BACKGROUND OF THE INVENTION

1. Field of the Invention

The invention relates to communication system and, more particularly, to a method and apparatus for adjusting reference frequency of communication system.

2. Description of the Prior Art

Frequency division multiplexing transmission technology is mostly used for modern wireless communication system, and its principle is to divide usable bandwidth into numbers of frequency bands to enable the data to be parallelly transmitted via those frequency bands to promote data transmission rate.

The radio waves will be influenced by the terrain or the surface features during transmission in air, and some phenomena which lower the quality of signal are generated, such as refraction, diffraction, interference, multipath fading and so on. However, those problems can be avoided by utilizing orthogonal frequency division multiplexing (OFDM). Besides, the OFDM is capable of high data transmission rate, high bandwidth utility rate and avoiding multipath fading and thereby is generally applied to modern wireless communication system.

However, since the frequency band is divided into numbers of sub-channels, the sensitivity of signal with frequency is substantially improved. Consequently, in the OFDM wireless communication system, it becomes a critical issue to perform frequency recovery with received signal based on accurate reference frequency and further read the data accurately in the signal.

In traditions, in order to recover a shifted reference frequency caused by noises in the OFDM wireless communication system, a pseudo-noise sequence usually is used for estimating shifted amount of a reference frequency. However, the calculation of estimating shifted amount of the reference frequency used by this method is very huge. Moreover, due to the influence of selectively fading at some sub-channels, the shifted amount estimation of the reference frequency will be incorrect, and thereby calibration of the reference frequency will be hard to proceed.

Accordingly, the main goal of the invention is to provide a method and apparatus for adjusting reference frequency of the wireless communication receiving terminal, so as to solve the aforesaid problems.

SUMMARY OF THE INVENTION

The method and apparatus according to the invention mainly utilizes a training signal for adjusting a reference frequency of wireless communication system. By estimating shifted amount of a plurality of training sequence, comprised in the training signal, generated by wireless signal transmission, according to the method and apparatus of the invention, a difference of the reference frequency between a transmitting terminal and a receiving terminal can be calculated, and adjust the reference frequency of the receiving terminal based on the difference to achieve frequency synchronization.

According to an embodiment of the invention, it presents a method for adjusting a reference frequency. First of all, the method receives a training signal based on the reference frequency. Then the method divides an original training sequence [T(X)] into a target region of the training signal to generate a quotient polynomial. Afterward, the method divides a predetermined polynomial [H(X)] into the quotient polynomial to generate a remainder polynomial. Finally, the method adjusts the reference frequency based on the remainder polynomial.

The method and apparatus of the invention not only improves disadvantages of huge calculation in prior art, errors in estimating shifted amount of the reference frequency caused by selectively fading at certain sub-channels, receiving terminal shaker aging, but also effectively adjusts the reference frequency of wireless communication system receiving terminal.

The advantage and spirit of the invention may be understood by the following recitations together with the appended drawings.

DETAILED DESCRIPTION OF THE INVENTION

Figure 1:
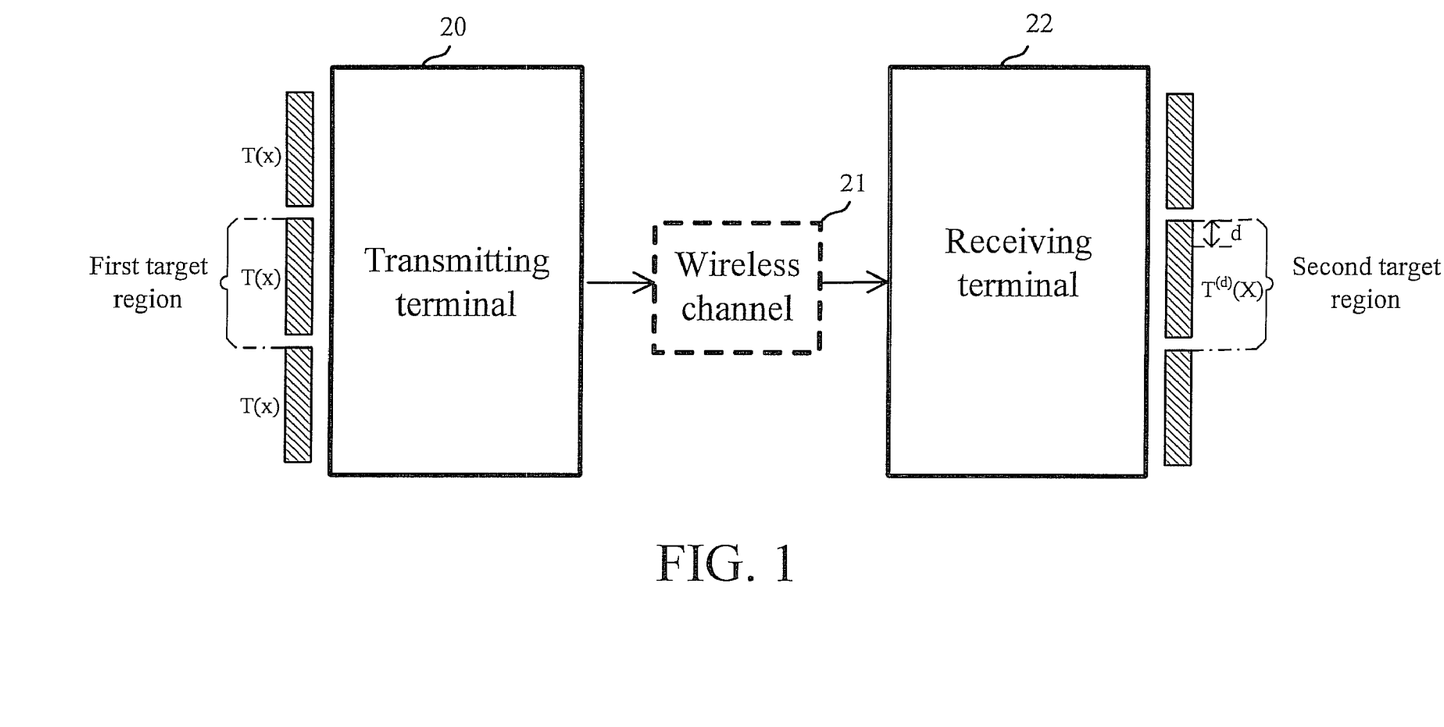
FIG. 1 is a schematic diagram illustrating a training signal is transmitted from a transmitting terminal to a receiving terminal through a wireless channel in a wireless communication system.

The invention provides a system and method for adjusting a reference frequency of a communication system. According to a first embodiment of the invention is a method for adjusting a reference frequency of a receiving terminal. FIG. 1 is an example illustrating an OFDM wireless communication system. In this embodiment, a transmitting terminal 20 transmits an original training signal by OFDM first, the original training signal comprises a plurality of original signal sequence [T(X)] repeat-arranged in frequency domain. And, the original training sequence [T(X)] is a polynomial with binary coefficient and set as a factor of $(1+X^N)$.

The method and apparatus according to the invention can select a first target region as shown in FIG. 1 from the original training signal, wherein it can be applied to OFDM transmission in this embodiment. The transmitting terminal 20 is an OFDM transmitter; a receiving terminal 22 is an OFDM receiver. And, a first target region at transmitting terminal 20 is set, wherein a length of the first target region is equal to that of the original training sequence [T(X)].

The receiving terminal 22 is the one to receive the original training signal transmitted from the transmitting terminal 20 based on a reference frequency. In the condition without adjustments, there will usually be a little difference between the reference frequency at the receiving terminal 22 and an original frequency of the original training signal at transmitting terminal 20. In other words, the problem of asynchronous frequency will induce a signal received by receiving terminal 22 cyclic shift.

First, considering the condition of error free in a wireless channel 21, as shown in FIG. 1, the receiving terminal 22 can choose a second target region corresponding to the first target region from the received training signal. Under a condition of synchronous frequency between the transmitting terminal 20 and the receiving terminal 22, a training signal received in the second target region shall be an original training signal [T(X)].

However, under the condition of asynchronous frequency between the transmitting terminal 20 and the receiving terminal 22, a training signal received in the second target region may be a shifted training signal [$T^{(d)}(X)$]. As shown in FIG. 1, there is d units shifted amount between $T^{(d)}(X)$ and T(X). The training signal received in the second target region comprises a plurality of shifted training signal [$T^{(d)}(X)$], and those shifted training signal are repeatedly arranged in the frequency domain as well.

According to a communication theory about cyclic shift, $T^{(d)}(X)$ can be shown as:

$$T^{(d)}(X) = X^d T(X) + q(X)(1+X^N) \qquad (Eq.1)$$

Wherein $X^d T(X)$ is a linear shift of T(X). As described as above, T(X) is a factor of $(1+X^N)$. Consequently, $(1+X^N)$ can be shown as a product of T(X) and another predetermined polynomial [H(X)]. Equation 1 can be further shown as equation 2:

$$T^{(d)}(X) = X^d T(X) + q(X)T(X)H(X) \qquad (Eq.2)$$

Dividing T(X) into $T^{(d)}(X)$ to generate a quotient polynomial:

$$\frac{T^{(d)}(X)}{T(X)} = X^d + q(X)H(X) \qquad (Eq.3)$$

Because T(X) is known, so the predetermined polynomial [H(X)] is known too. By equation 3, a remainder polynomial generated from equation 3 divided by the predetermined polynomial [H(X)] is $X^d$. In other words, $X^d$ can be shown as:

$$X^d = \left[\frac{T^d(X)}{T(X)}\right]_{moduloH(X)} \qquad (Eq.4)$$

From the remainder polynomial $X^d$ shown in equation 4, the shifted amount between $T^{(d)}(X)$ and T(X) can be known. For example, if $X^d$ is equal to $X^3$, it means that there are 3 unit shifted amounts between $T^{(d)}(X)$ and T(X); if $X^d$ is equal to $X^5$, it means that there are 5 unit shifted amounts between $T^{(d)}(X)$ and T(X), so as to analogize. The shifted amount is corresponding to frequency difference between the transmitting terminal 20 and receiving terminal 22. Accordingly, the reference frequency of the receiving terminal can be adjusted based on the shifted amount according to the method and apparatus of the invention.

Figure 2:
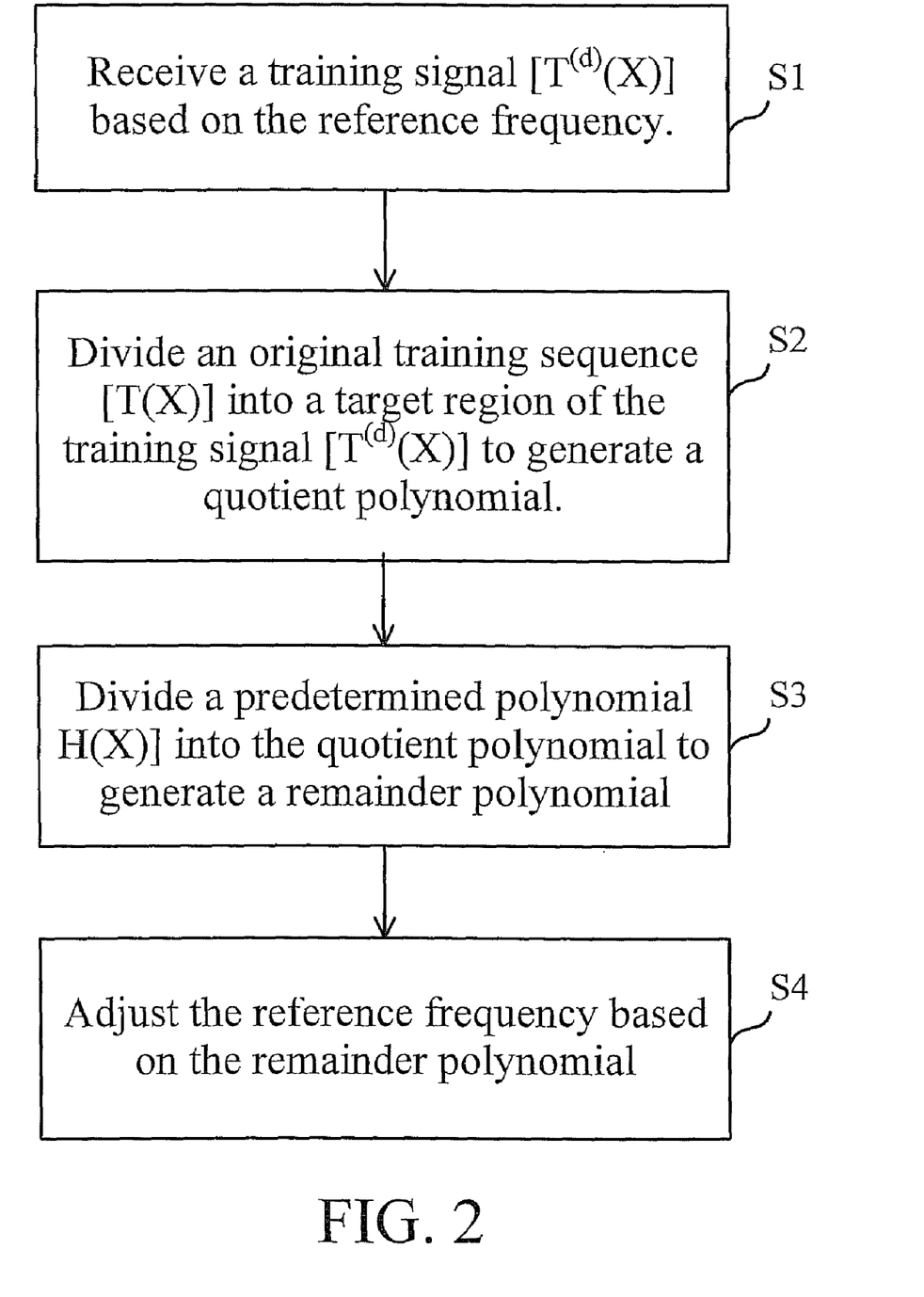
FIG. 2 is a flow chart showing a method for adjusting a reference frequency according to a first embodiment of the invention.

Please refer to FIG. 2. FIG. 2 is a flow chart showing a method described as above. As shown as FIG. 2. First of all, Step S1 is performed to receive a training signal based on the reference frequency. Step S2 is then performed to divide an original training sequence [T(X)] into a target region of the training signal to generate a quotient polynomial. Afterward, step S3 is then performed to divide a predetermined polynomial [H(X)] into the quotient polynomial to generate a remainder polynomial. Finally, step S4 is performed to adjust the reference frequency based on the remainder polynomial.

Furthermore, consider the condition that there is a noise existing in the transmission of wireless communication system. Assume that it is influenced by the noise in wireless channel 21, a signal [R(X)] received by the receiving terminal 22 is $T^{(d)}(X)$ added to [e(X)]. R(X) can be shown as:

$$R(X) = T^{(d)}(X) + e(X) \qquad (Eq.5)$$

According to equation 2 and equation 5, the following equation can be obtained:

$$R(X) = X^d T(X) + q(X)T(X)H(X) + e(X) \qquad (Eq.6)$$

Dividing T(X) into R(X) to generate a quotient polynomial:

$$\left[\frac{R(X)}{T(X)}\right]_{quotient} = X^d + q(X)H(X) + \left[\frac{e(X)}{T(X)}\right]_{quotient} \qquad (Eq.\ 7)$$

A remainder polynomial which divides H(X) into $[R(X)/T(X)]_{quotient}$ calculated from equation 7 is the sum of $[e(X)/T(X)]_{quotient}$. The relationship can be shown as following:

$$\left\{\left[\frac{R(X)}{T(X)}\right]_{quotient}\right\}_{moduloH(X)} = X^d + \left[\frac{e(X)}{T(X)}\right]_{quotient} \qquad (Eq.\ 8)$$

As the order of e(X) is smaller then that of T(X), $[e(X)/T(X)]_{quotient}$ is equal to 0. At this time, the transmission circumstance of wireless communication system can be considered as a transmission circumstance of error free, so the following signal processing mode is the same as that of the above. In this condition, the calculated result from equation 8 should be a monomial (i.e. $X^d$). Relatively, as the order of e(X) is larger then that of T(X), the calculated result from equation 8 may be a monomial (such as $2*X^3$) or a polynomial (such as $X^2+X^3$, X+1, and so on).

In the condition that the order of e(X) is larger then that of T(X) described as above, the calculated result from equation 8 can not immediately differentiate the respective part of contribution between $X^d$ and $[e(X)/T(X)]_{quotient}$. In order to accurately determine the shifted amount of the reference frequency, the method and apparatus according to this invention utilizes a characteristic of R(X) repeatedly arranged in the frequency domain to eliminate the influence caused by e(X). Say it more correctly, e(X) can be shifted to lower order by a mode of cyclic shift to make the order of e(X) smaller then that of T(X), and further make $[e(X)/T(X)]_{quotient}$ become 0. Consequently, the influence caused by noises in estimating shifted amount can be eliminated.

Figure 3:
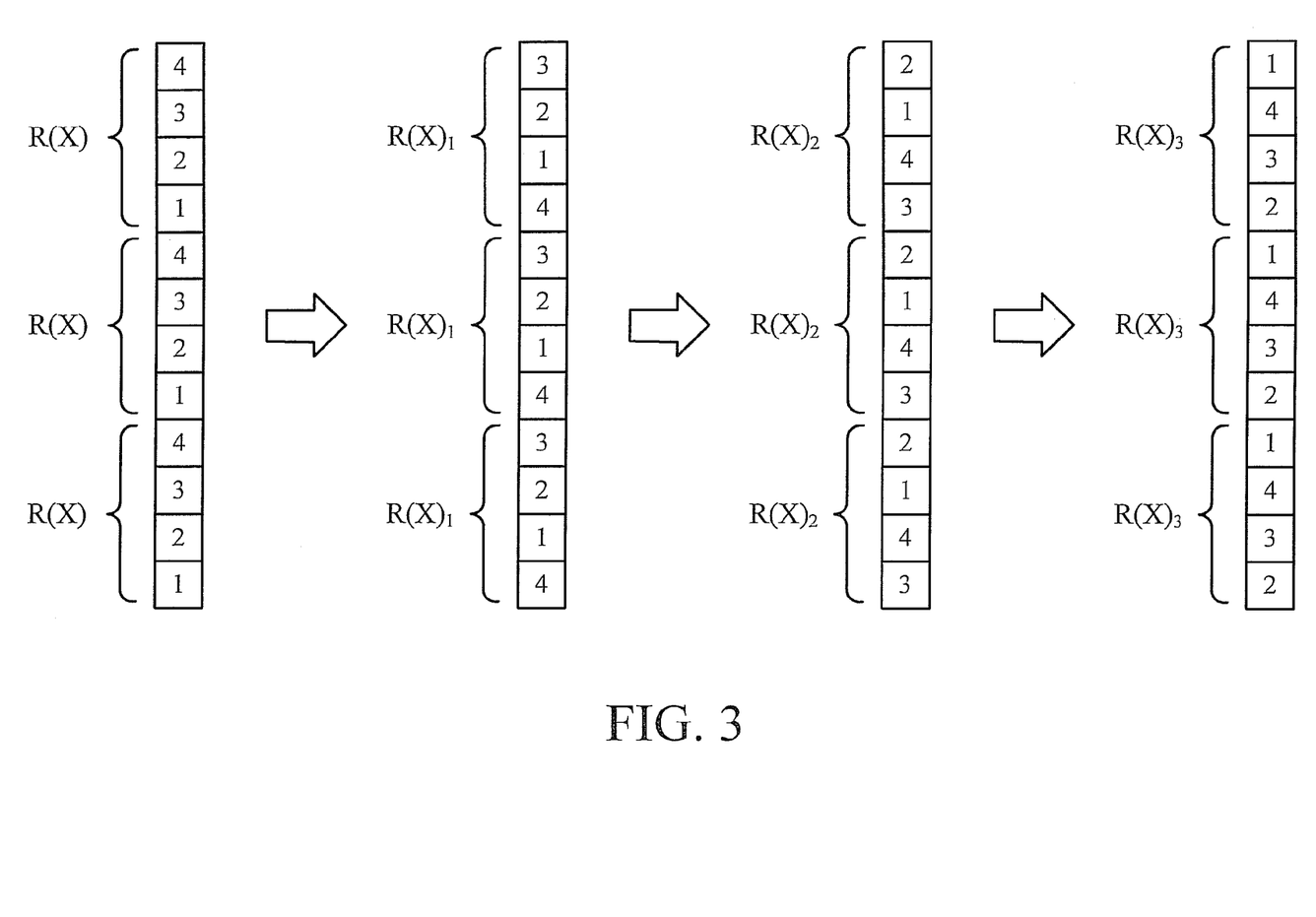
FIG. 3 is a schematic diagram illustrating cyclic shift.

Please refer to FIG. 3, FIG. 3 is a schematic diagram illustrating cyclic shift. Assume that R(X) cyclicly shifted P units frequency can be shown as $R(X)_P$. R(X) is $4X^3+3X^2+2X^1+1$. As shown in FIG. 3, coefficients [4,3,2,1] of R(X) are repeatedly arranged in the frequency domain. Coefficients of $R(X)_1$ cyclicly shifted 1 unit frequency become [3,2,1,4], coefficients of $R(X)_1$ cyclicly shifted 2 units frequency become [2,1,4,3], so as to analogize.

The method and apparatus according to the invention can cyclicly shift R(X) 1 unit frequency per time, and repeatedly utilize the equation 8 to calculate correspondingly shifted R(X) to generate new remainder polynomial. For example, the method and apparatus according to the invention can cyclicly shift R(X) N times to generate $R(X)_1, R(X)_2, \ldots,$ and $R(X)_N$, N shifted R(X). N is a positive integer. N remainder polynomials can be correspondingly calculated by respectively substituting $R(X)_1, R(X)_2, \ldots,$ and $R(X)_N$ into the equation 8.

In the process of cyclicly shifting R(X) N times described as above, there may be several conditions that e(X) is shifted to be in the lower order. As described as above, when the order of e(X) is smaller then that of T(X), the calculated result from equation 8 will be a monomial. Accordingly, the method and apparatus according to the invention will choose at least one remainder polynomial with monomial from N remainder polynomials as predetermined polynomials. Then, it can statistically analyze the predetermined polynomials based on the method and apparatus according to the invention to find out a predetermined polynomial which appeared most frequently as $X^d$. For example, the predetermined polynomials may have 1 X, 1 $X^2$, and 5 $X^3$. Because $X^3$ appears most frequently, so $X^d$ is most possible equal to $X^3$. The method and apparatus according to the invention can adjust the reference frequency of the receiving terminal accordingly.

Figure 4:
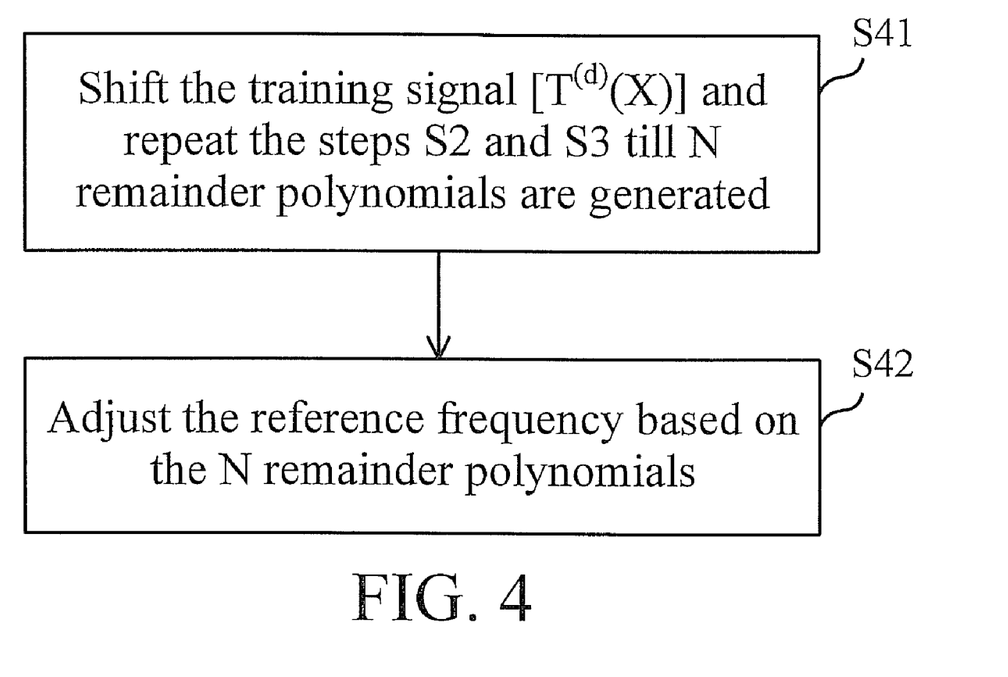
FIG. 4 is a flow chart showing illustrating step S4 shown in FIG. 2 comprises sub-steps S41~S42.

Please refer to FIG. 4. FIG. 4 is a flow chart illustrating step S4, shown in FIG. 2, further comprising sub-steps S41~S42. As shown in FIG. 4, sub-step S41 is performed to shift the training signal and repeat the steps S2 and S3 till N remainder polynomials are generated. In another word, those shifted training signal comprised in training signal can be cyclicly shifted their arrangement orders and repeating the steps S2 and S3 till N remainder polynomials are generated, wherein N is a positive integer. Afterward, sub-step S42 is performed to adjust the reference frequency based on the N remainder polynomials.

Figure 5:
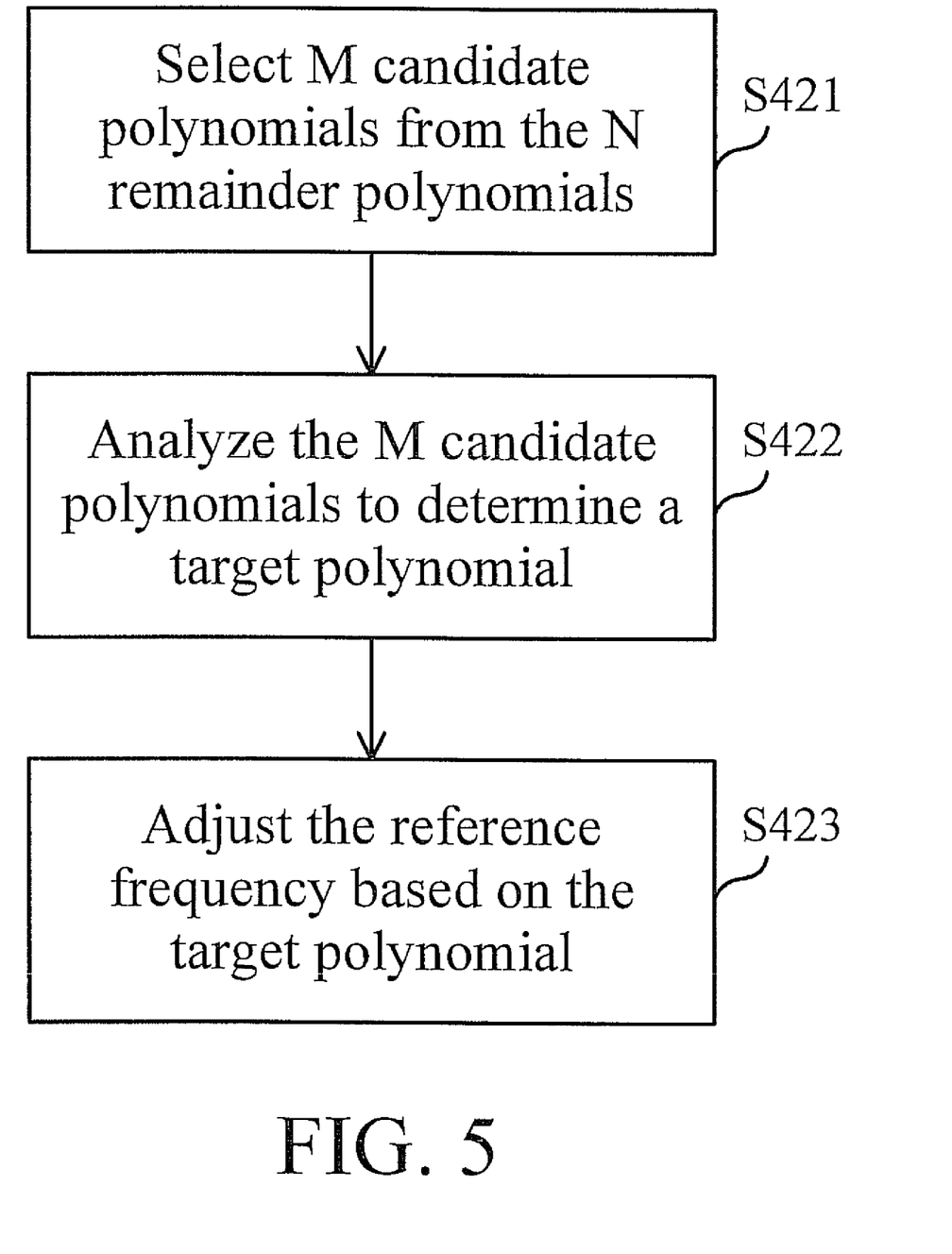
FIG. 5 is a flow chart showing illustrating step S42 shown in FIG. 4 comprises sub-steps S421~S423.

Please refer to FIG. 5, FIG. 5 is a flow chart illustrating the step S42 shown in FIG. 4, which further comprises sub-steps S421~S423. As shown in FIG. 5, the sub-step S421 is performed to select M candidate polynomials from the N remainder polynomials. Wherein M is a positive integer smaller than or equal to N, and each of the M candidate polynomials is a monomial. Sub-step S422 is then performed to analyze the M candidate polynomials to determine a target polynomial. That is to say that it determines the target polynomial based on appearance frequency of M candidate polynomials. Sub-step S423 is then performed to adjust the reference frequency based on the target polynomial.

Figure 6:
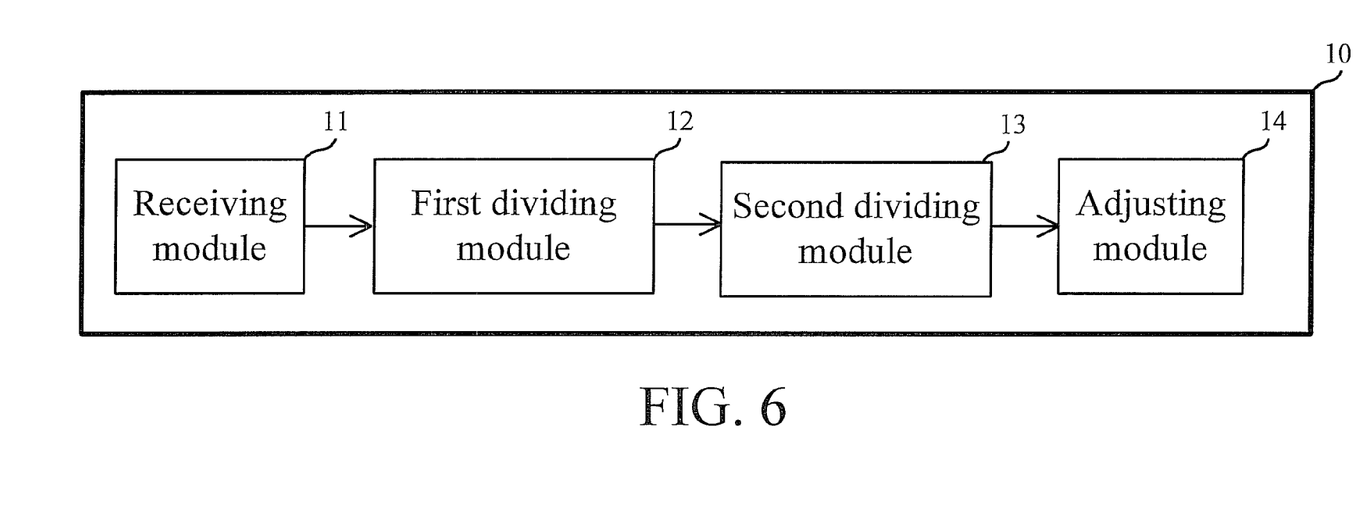
FIG. 6 is a functional block diagram illustrating an apparatus for adjusting a reference frequency according to a second embodiment of the invention.

According to a second embodiment of the invention, an apparatus is used for adjusting a reference frequency. Please refer to FIG. 6. FIG. 6 is a functional block diagram illustrating an apparatus for adjusting a reference frequency according to a second embodiment of the invention. As shown in FIG. 6, a reference frequency adjusting apparatus 10 comprises a receiving module 11, a first dividing module 12, a second dividing module 13 and an adjusting module 14. The receiving module 11 is used for receiving a training signal based on the reference frequency. The first dividing module 12 is used for dividing an original training sequence [T(X)] into a target region of the training signal to generate a quotient polynomial. The second dividing module 13 is used for dividing a predetermined polynomial [H(X)] into the quotient polynomial to generate a remainder polynomial. The adjusting module 14 is used for adjusting the reference frequency based on the remainder polynomial.

In practical, the original training sequence [T(X)] can be a binary polynomial; moreover, the product of the original training sequence [T(X)] and the predetermined polynomial [H(X)] can be $(1+X^N)$. The training signal can comprise a plurality of shifted training sequences $[T^{(d)}(X)]$. Those shifted training sequences are comprised in the training signal under a cyclic mode. Each of those shifted training sequences $[T^{(d)}(X)]$ is respectively related to the original training sequence [T(X)]. A length of the target region is equal to that of the original training sequence [T(X)].

Figure 7:
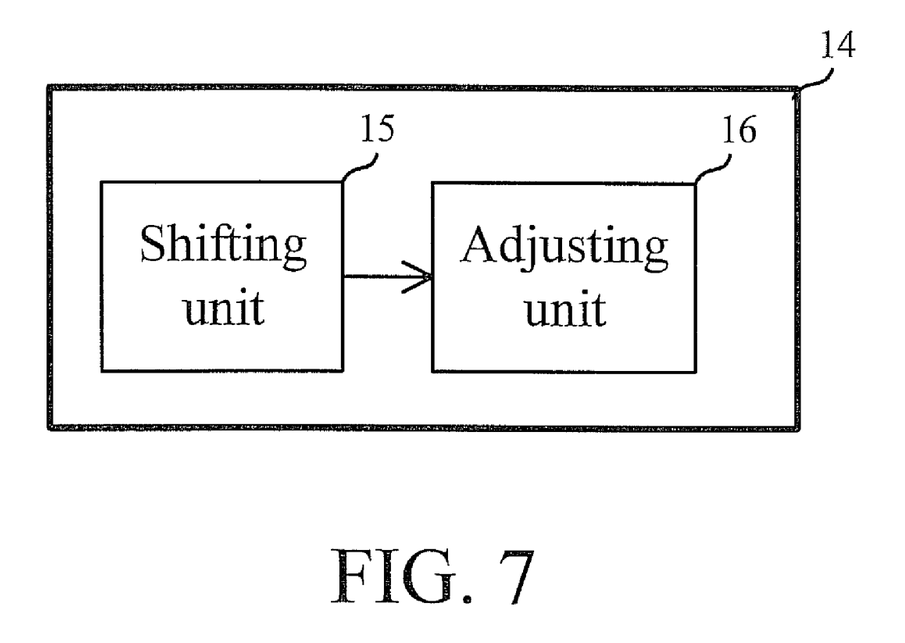
FIG. 7 is a functional block diagram illustrating the adjusting module, shown in FIG. 6, which comprises a shifting unit and an adjusting unit.

As shown in FIG. 7, the adjusting module 14 shown in FIG. 6 can further comprise a shifted unit 15 and an adjusting unit 16. The shifted unit 15 is used for shifting the training signal and repeating the first and the second dividing modules till N remainder polynomials are generated, wherein N is a positive integer. The adjusting unit 16 is used for adjusting the reference frequency based on the N remainder polynomials.

Figure 8:
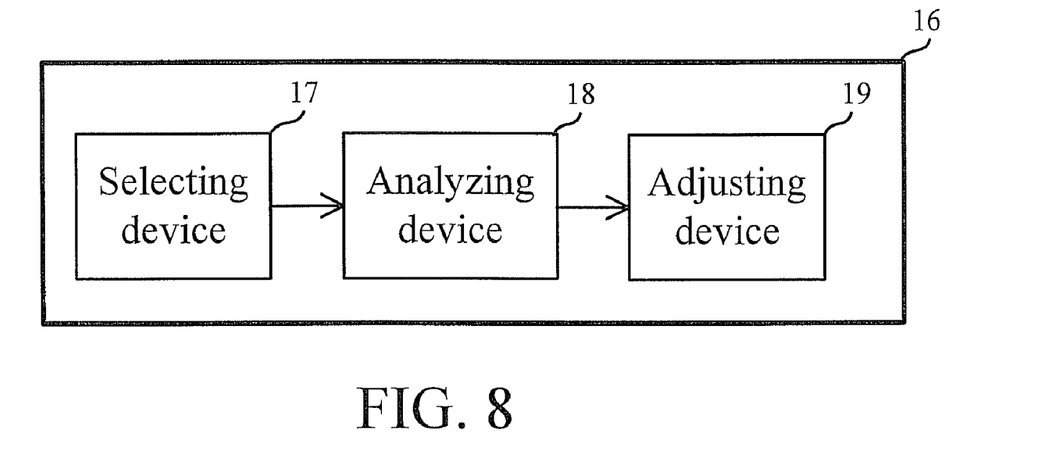
FIG. 8 is a functional block diagram illustrating the adjusting unit shown in FIG. 7 which comprises a selecting device, an analyzing device and an adjusting device.

As shown in FIG. 8, the adjusting unit 16 shown in the above can further comprise a selecting device 17, an analyzing device 18 and an adjusting device 19. The selecting device 17 is used for selecting M candidate polynomials from the N remainder polynomials, wherein M is a positive integer smaller than or equal to N, and each of the M candidate polynomials is a monomial. The analyzing device 18 is used for analyzing the M candidate polynomials to determine a target polynomial, wherein the analyzing device 18 analyzes the M candidate polynomials through statistics. The adjusting device 19 is used for adjusting the reference frequency based on the target polynomial.

Besides, the reference frequency adjusting apparatus 10 can also further comprise a transmitting module (not shown in figure). The transmitting module is used for transmitting an original training signal by orthogonal frequency division multiplexing, wherein the original training signal is corresponding to the training signal received by the receiving module.

Compared with prior art, the method and apparatus of the invention not only improves disadvantages of huge calculation in prior art, errors in estimating shifted amount of the reference frequency caused by selectively fading at certain sub-channels, receiving terminal shaker aging, but also accurately adjusts the reference frequency of the wireless communication system receiving terminal to achieve the frequency synchronization between the receiving terminal and the transmitting terminal of wireless communication.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A method for adjusting a reference frequency, applied to a receiving terminal, comprising steps of:
    (a) receiving a training signal based on the reference frequency at the receiving terminal;
    (b) dividing an original training sequence [T(X)] into a target region of the training signal to generate a quotient polynomial;
    (c) dividing a predetermined polynomial [H(X)] into the quotient polynomial to generate a remainder polynomial; and
    (d) adjusting the reference frequency based on the remainder polynomial.

2. The method of claim 1, wherein the original training sequence [T(X)] is a polynomial with binary coefficient.

3. The method of claim 1, wherein a product of the original training sequence [T(X)] and the predetermined polynomial [H(X)] is $(1+X^N)$.

4. The method of claim 1, wherein the training signal comprises a plurality of shifted training sequences $[T^{(d)}(X)]$, and each of the plurality of shifted training sequences [$T^{(d)}(X)$] is respectively related to the original training sequence [$T(X)$].

5. The method of claim 4, wherein the plurality of shifted training sequences [$T^{(d)}(X)$] is comprised in the training signal under a cyclic mode.

6. The method of claim 1, wherein a length of the target region is equal to that of the original training sequence [$T(X)$].

7. The method of claim 1, wherein the step (d) comprises steps of:
   (d1) shifting the training signal and repeating the steps (b) and (c) till N remainder polynomials are generated, wherein N is a positive integer; and
   (d2) adjusting the reference frequency based on the N remainder polynomials.

8. The method of claim 7, wherein the step (d2) comprises steps of:
   (d21) selecting M candidate polynomials from the N remainder polynomials, wherein M is a positive integer smaller than or equal to N, and each of the M candidate polynomials is a monomial;
   (d22) analyzing the M candidate polynomials to determine a target polynomial; and
   (d23) adjusting the reference frequency based on the target polynomial.

9. The method of claim 8, wherein the step (d22) is performed to analyze the M candidate polynomials through statistics.

10. The method of claim 1, further comprises step of:
    transmitting an original training signal from a transmitting terminal by orthogonal frequency division multiplexing;
    wherein the original training signal is corresponding to the training signal received in step (a).

11. An apparatus for adjusting a reference frequency, comprising:
    a receiving module for receiving a training signal based on the reference frequency;
    a first dividing module for dividing an original training sequence [$T(X)$] into a target region of the training signal to generate a quotient polynomial;
    a second dividing module for dividing a predetermined polynomial [$H(X)$] into the quotient polynomial to generate a remainder polynomial; and
    an adjusting module for adjusting the reference frequency based on the remainder polynomial.

12. The apparatus of claim 11, wherein the original training sequence [$T(X)$] is a polynomial with binary coefficient.

13. The apparatus of claim 11, wherein the product of the original training sequence [$T(X)$] and the predetermined polynomial [$H(X)$] is ($1+X^N$).

14. The apparatus of claim 11, wherein the training signal comprises a plurality of shifted training sequences [$T^{(d)}(X)$], and each of the plurality of shifted training sequences [$T^{(d)}(X)$] is respectively related to the original training sequence [$T(X)$].

15. The apparatus of claim 14, wherein the plurality of shifted training sequences [$T^{(d)}(X)$] is comprised in the training signal under a cyclic mode.

16. The apparatus of claim 11, wherein a length of the target region is equal to that of the original training sequence [$T(X)$].

17. The apparatus of claim 11, wherein the adjusting module comprises:
    a shifted unit for shifting the training signal and repeating the first and the second dividing modules till N remainder polynomials are generated, wherein N is a positive integer; and
    an adjusting unit for adjusting the reference frequency based on the N remainder polynomials.

18. The apparatus of claim 17, wherein the adjusting unit comprises:
    a selecting device for selecting M candidate polynomials from the N remainder polynomials, wherein M is a positive integer smaller than or equal to N, and each of the M candidate polynomials is a monomial;
    an analyzing device for analyzing the M candidate polynomials to determine a target polynomial; and
    an adjusting device for adjusting the reference frequency based on the target polynomial.

19. The apparatus of claim 18, wherein the analyzing device analyzes the M candidate polynomials through statistics.

20. The apparatus of claim 11, further comprising:
    a transmitting module for transmitting an original training signal by orthogonal frequency division multiplexing;
    wherein the original training signal is corresponding to the training signal received by the receiving module.

* * * * *